United States Patent [19]

Frushour

[11] Patent Number: 5,236,674
[45] Date of Patent: Aug. 17, 1993

[54] HIGH PRESSURE REACTION VESSEL

[76] Inventor: Robert H. Frushour, 2313 Devonshire, Ann Arbor, Mich. 48104

[21] Appl. No.: 826,809

[22] Filed: Jan. 28, 1992

[51] Int. Cl.$^5$ ............................................. B01J 19/02
[52] U.S. Cl. .................................... 422/241; 422/211; 422/240; 422/242; 249/114.1
[58] Field of Search ............... 422/241, 242, 211, 240; 51/307, 309, 293; 249/114.1

[56] References Cited

U.S. PATENT DOCUMENTS

| | | | |
|---|---|---|---|
| 2,941,241 | 6/1960 | Strong | 425/77 |
| 2,941,248 | 6/1960 | Hall | 425/77 |
| 2,992,900 | 7/1961 | Bovenkerk | 423/446 |
| 3,030,662 | 4/1962 | Strong | 249/114.1 |
| 3,088,170 | 5/1963 | Strong | 425/77 |
| 4,259,090 | 3/1981 | Bovenkerk | 51/309 |
| 4,260,397 | 4/1981 | Bovenkerk | 51/307 |
| 4,518,659 | 5/1985 | Gigl et al. | 51/307 |
| 4,522,633 | 6/1985 | Dyer | 51/307 |
| 4,954,139 | 9/1990 | Cerutti | 51/293 |

Primary Examiner—James C. Housel
Assistant Examiner—Rachel Freed
Attorney, Agent, or Firm—Basile and Hanlon

[57] ABSTRACT

A high pressure reaction vessel includes an inner bushing surrounding a reaction charge. The inner bushing is formed of at least one material having a low shear strength that undergoes a polymorphic phase change to a more dense phase within the operating pressure range of the reaction vessel. The bushing may be formed of at least two low shear strength materials with one of the materials undergoing polymorphic phase change to a more dense phase. The one of the two materials which undergoes a polymorphic phase change forms between 10% and 90% of the total volume of the inner bushing. In another embodiment, a pressure transmitting media and an electrical resistance heater tube are concentrically arranged within the inner bushing. The pressure transmitting media is formed of a low shear strength material that undergoes a polymorphic phase change to a more dense phase. In both embodiments, the low shear strength material undergoing polymorphic phase change is potassium bromide.

5 Claims, 3 Drawing Sheets

HIGH PRESSURE REACTION VESSEL

BACKGROUND OF THE INVENTION

1. Field of the Invention:

This invention relates to an improved reaction vessel for a high pressure/high temperature belt type apparatus. This invention also relates to any type of high pressure apparatus wherein substantial extrusion or deformation of gasketing material occurs. More particularly, this invention relates to use of low shear strength materials that undergo pressure-induced phase transformations that can be employed in combination with other low shear strength materials to minimize the distortion of reaction vessel components that conduct electrical current for the purpose of generating heat and to minimize the distortion of as-pressed polycrystalline diamond compacts.

1. Description of the Art

In general, a reaction vessel may be described as a inner vessel or capsule within which there is positioned a given specimen material to be subjected to high pressure/high temperature conditions for research study or for manufacture of useful materials or articles. Similar prior art reaction vessels of the belt type and the cubic type have been described in numerous patents and, more specifically, in U.S. Pat. Nos. 2,941,241 to Strong; 2,941,248 to Hall; 2,992,900 to Bovenkerk; and 3,088,170 to Strong, together with suitable apparatus for the application of the pressures involved.

Ordinarily, an ultrahigh pressure/high temperature reaction vessel is adapted to undergo considerable deformation; e.g., when placed in a confining apparatus or enclosure, such as a defined belt or chamber, and then subjected to compression by suitable moving members. The distribution of pressure in reaction vessels of this type is the subject of a U.S. Pat. No. 3,030,662 to Strong. This patent discusses the use of low shear strength materials for the purpose of transmitting substantially hydrostatic pressure to the inner two-thirds to four-fifths of the reaction vessel. Although the patent states that mixtures or combinations of various low shear strength materials can be employed and can also be used in combination with suitable high strength materials, it does not provide a solution to the problem of distortion or dislocation of essential reaction vessel components during compression to high pressures.

More recently, the problem of obtaining precise control over the temperature caused by the deformation of the end assemblies of such high pressure/high temperature reaction vessels was the subject of the Applicant's co-pending U.S. patent application Ser. No. 07/660,332, filed on Feb. 22, 1991, and entitled "MODIFIED END ASSEMBLY FOR HIGH PRESSURE, HIGH TEMPERATURE REACTION VESSELS". However, the substantial outward extrusion of the gasketing that occurs during compression results in unwanted deformation of still other critical internal reaction vessel components, thus affecting the uniform distribution of both pressure and heat throughout the vessel.

Accordingly, an improved reaction vessel is desirable wherein the internal components are not significantly distorted during compaction at ultrahigh pressures in a belt or cubic type high pressure apparatus.

SUMMARY OF THE INVENTION

A conventional reaction vessel includes a central sample holder or bushing that surrounds the reactants and transmits pressure while, at the same time, providing insulation against heat loss to the surrounding tooling. When this bushing is composed substantially of low shear strength material, it becomes necessary to cap each end of the bushing with a high shear strength component to prevent sudden decompression due to uncontrollable flow of the low shear strength material through the high pressure gasketing.

The bushing is further surrounded by a cylindrical jacket constructed of a higher shear strength material which serves to further insulate the tooling from the high temperatures of the reaction zone and to provide a gasket to seal the internal components at high operating pressures. In the case of a cubic high pressure apparatus, this outer jacket is a cube unlike the cylindrical nature of the part required for the belt apparatus. As the anvils of the high pressure apparatus move toward each other, the entire reaction vessel becomes compressed and a significant portion of the outer jacket is extruded out of the reaction zone. As this occurs, some of the inner bushing material also flows in an outward direction to take the original position of the outer jacket. This movement of the bushing causes other internal reaction vessel components to become distorted beyond the original intent, namely, to uniformly compress these components along each of the three spatial coordinates.

The present invention utilizes a low shear strength material that undergoes a reversible phase change to a more dense phase under pressure to minimize the outward flow of the bushing material. During compression, portions of the modified bushing collapse rather than flow radially outward, consequently retarding the undesirable distortion of other reaction vessel components.

For the production of synthetic industrial saw type diamond, the internal charge of graphite and catalyst that is cylindrical in shape must not become so distorted during compression that the pressure and/or temperature is affected when electric current is supplied to heat the sample. According to the teachings of this invention, a low shear strength material that undergoes a reversible negative volumetric phase change with pressure is employed on each end of the bushing in the area where the majority of the conventional bushing material is deformed. The central portion of the modified bushing is constructed of a low shear strength material that does not undergo a volumetric phase change to a denser phase. This modification of the bushing maintains the right circular cylindrical shape of the graphite-catalyst charge during compression.

The production of polycrystalline diamond or cubic boron nitride compacts can also benefit from a similarly modified bushing since heat is obtained by passing electric current through a cylindrical graphite tube and excessive distortion of this tub results in a nonuniform heat distribution throughout the reaction zone. Additionally, since these compacts are composed of superhard materials, it is advantageous to press the compacts to as near a net or final shape as possible in order to reduce the amount of subsequent finish grinding. To accomplish this net shape objective, an additional modification of the reaction vessel can be made according to the teachings of this invention. This modification consists of replacing the pressure transmitting components inside the graphite heater tube with the low shear strength material that undergoes a phase change as previously described.

BRIEF DESCRIPTION OF THE DRAWING

This invention will be better understood when taken in connection with the following description and the drawings in which.

DESCRIPTION OF THE PREFERRED EMBODIMENTS

Figure 1:
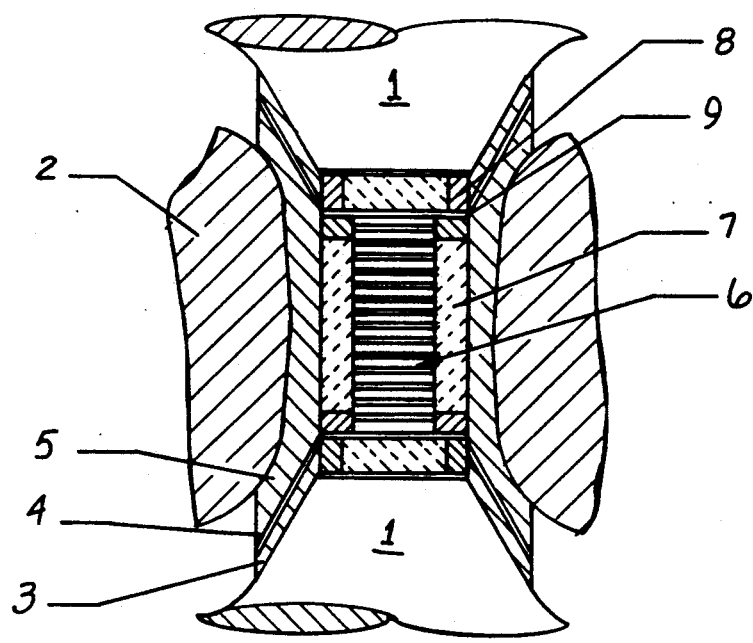
FIG. 1 is a cross sectional view of a prior art reaction vessel within a belt type high pressure apparatus.

Descriptions of prior art reaction vessels can be found throughout the literature and by studying various patents on diamond synthesis. More specifically, U.S. Pat. No. 2,992,900 to Bovenkerk describes reaction vessels for which modification by the present invention is particularly suited. A reaction vessel of this type is shown in FIG. 1 positioned within a belt type high pressure apparatus. Pressure in the reaction vessel is obtained by advancing the anvils 1 into the cavity of the core 2. A gasket assembly is used to maintain the pressure in the reaction vessel and to seal the reaction vessel in the chamber of the core 2. A preferred gasket assembly includes a frustro-conical gasket 3 positioned concentrically on the tapered surface of each anvil 1, a soft iron frusto-conical gasket 4 positioned concentrically on gasket 3, and an outer jacket gasket 5 that is substantially frusto-conical in shape and is positioned between the gasket 4 and the inner wall of the core 2. The charge material 6 consists of layers of graphite and catalyst that are confined within the reaction vessel by a bushing 7 that is formed of a low shear strength material.

Resistance heating is accomplished by passing electric current through the anvils 1, steel rings 8, metal discs 9, and the electrically conductive charge 6.

Figure 2:
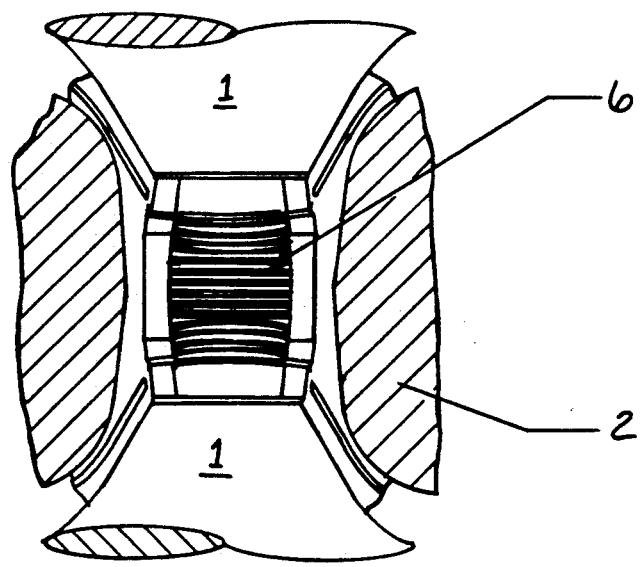
FIG. 2 is a cross sectional view of the prior art reaction vessel shown in Figure after compression.

FIG. 2 shows the deformation that occurs to the reaction vessel of FIG. 1 as the anvils 1 are advanced into the core 2 to obtain sufficient operating pressure to convert the graphite in the charge 6 to diamond. The charge 6 is compressed to approximately seventy percent of its original height and is deformed into a barrel shape. This deformation results in nonuniform distribution of both heat and pressure during the heat cycle. It would be desirable to have the charge 6 maintain its original right circular cylindrical shape during compression so that the graphite and catalyst layers remain flat and keep a constant thickness ratio throughout the volume of the charge 6. This is very important if the pressure and temperature are to be held constant at each and every location throughout the charge 6.

Figure 3:
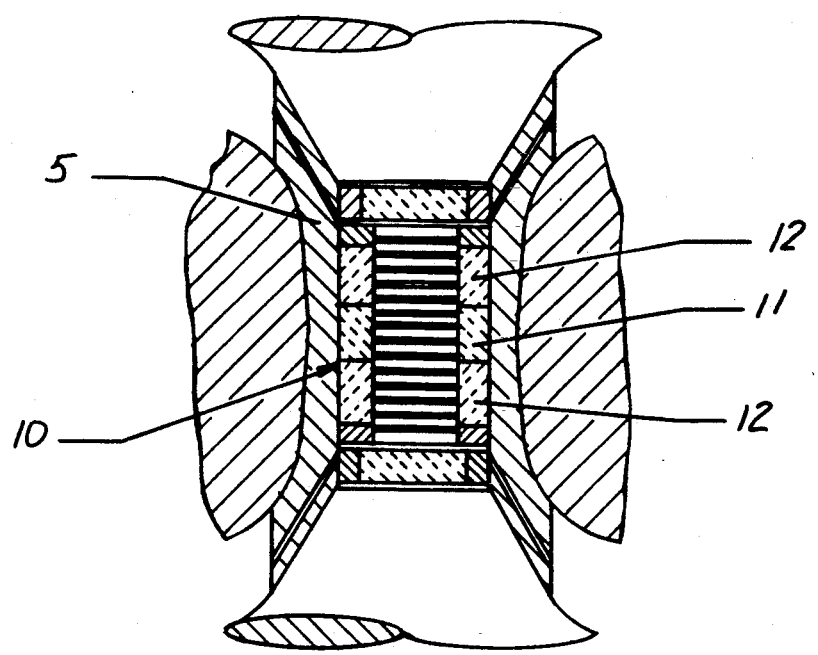
FIG. 3 is a cross sectional view of a reaction vessel modified in accordance with the teachings of the present invention.

By modifying the bushing 7 in FIG. 1 according to the teachings of this invention, the foregoing problems can be eliminated. Referring now to FIG. 3, the modified bushing 10 includes a center cylindrical component 11 formed of a low shear strength material and end components 12 that are fabricated from a low shear strength material that undergoes a polymorphic phase transition to a more dense phase at higher pressures. The combined thickness of the end components 12 may vary relative to the center component 11 depending upon the specific geometry and the final dimensions of the high pressure apparatus being used. For the belt type high pressure apparatus, the end components 12 may be from one-tenth to nine-tenths of the total length of the bushing 10.

The preferred low shear strength material for the central component 11 is sodium chloride (NaCl); however, pyrophyllite or a suitable synthetic substitute for pyrophyllite can also be used. The preferred material for the end components 12 is potassium bromide (KBr). This alkali halide salt undergoes a phase transition from the face-centered cubic structure to the more dense body-centered cubic crystal structure at a pressure of approximately 20 kb. The end components 12 are fabricated from compressed powdered potassium bromide (KBr) and, because the particles of potassium bromide (KBr) are randomly oriented, the actual transition takes place over a range of pressure from about 20 kb to about 35 kb. This is advantageous since it occurs slowly and over a broad enough pressure range to compensate for the movement of the outer jacket 5. It is understood that other such low shear strength materials that undergo similar phase changes can be substituted for potassium bromide (KBr), and combinations of these materials can be selected and used to further extend the range of pressure at which the phase transition occurs so that the compensation for the movement of the outer jacket 5 occurs more uniformly.

Figure 4:
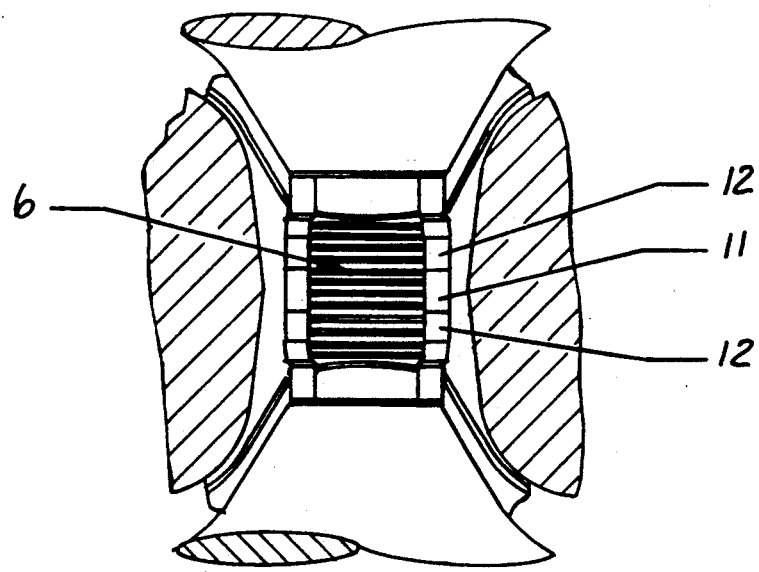
FIG. 4 is a cross sectional view of the reaction vessel shown in FIG. 3 after compression.

FIG. 4 is a cross sectional view that shows the deformation of the reaction vessel of FIG. 3 after compression to the pressure required for diamond synthesis. The graphite and catalyst layers of the charge 6 remain flat and parallel while, at the same time, the outer diameter of each layer is constant throughout the height of the stack. The more uniform distribution of pressure and temperature obtained by the compression of the reaction vessel of FIG. 3 results in more controllable nucleation and growth of diamond during the manufacturing process.

Figure 5:
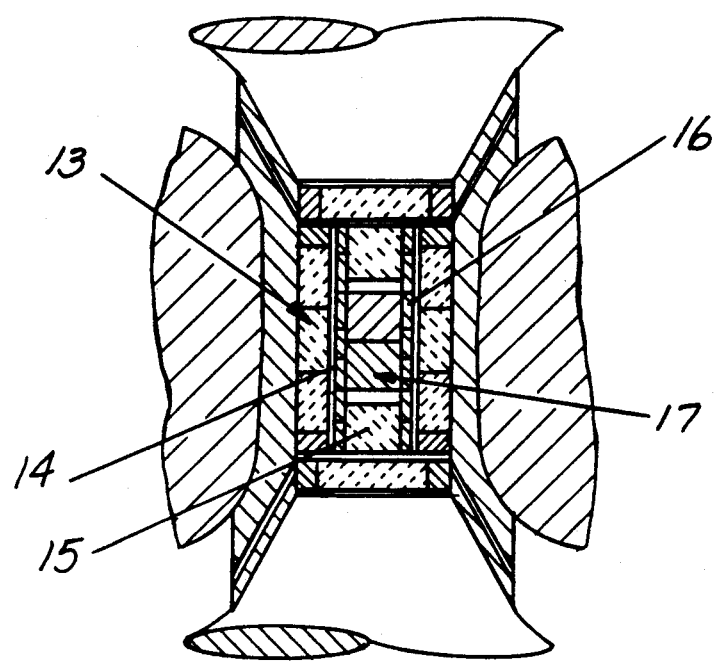
FIG. 5 is a cross sectional view of a reaction vessel modified in accordance with the teachings of this invention for the purpose of making polycrystalline diamond or cubic boron nitride compacts.

Similar problems occur during the manufacturing process of polycrystalline diamond or cubic boron nitride compacts. FIG. 5 is a cross sectional view of a reaction vessel modified in accordance with the teachings of this invention in order to prevent excessive distortion of the compacts and to provide a more balanced temperature throughout the reaction zone. The modified bushing 13 is identical to that of bushing 10 in FIG. 3. In this example the internal charge 6 is replaced by a graphite heater tube 14, potassium bromide (KBr) pills 15 and potassium bromide (KBr) sleeve 16 disposed within the graphite heater tube 14 and surroundingly compact assemblies 17.

Figure 6:
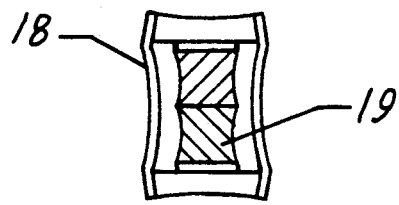
FIG. 6 is a cross sectional view of the inner portion of a prior art vessel used for the production of compacts after compression.
Figure 7:
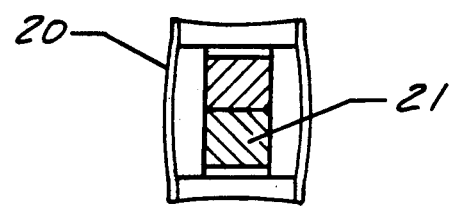
FIG. 7 is a cross sectional view of the inner portion of the vessel shown in FIG. 5 after compression.

FIGS. 6 and 7 show the relative shapes of the graphite heater tubes 18 and 20 and the compacts 19 and 21 after compression for a prior art reaction vessel in FIG. 6 versus that of FIG. 7 which shows the reaction vessel of FIG. 5 after compression.

The deformation of the graphite heater tube 18 results in a nonuniform temperature distribution throughout the reaction zone. The inner portion of the reaction vessel shown in FIG. 7, however, is much less distorted after compression resulting in compacts with an as-pressed shape nearer to the final required dimensions and higher quality sintering of the diamond due to more a uniform temperature in the reaction zone.

What is claimed is:

1. In an improved reaction vessel for a high pressure/high temperature apparatus having a reaction charge disposed in a reaction camber, the reaction vessel having an inner bushing, the improvement comprising:

the inner bushing concentrically disposed about and in contact with the reaction charge in the reaction chamber and having an intermediate portion formed of a first low shear strength material that does not undergo a polymorphic phase change to a more dense phase within the operating pressure range, and opposed end portions surrounding the intermediate portion formed of a second low shear strength material that undergoes a polymorphic phase change to a more dense phase within the operating pressure range.

2. The improvement of claim 1 wherein:
the second material is potassium bromide.

3. The improvement of claim 1 wherein:
the volume percent of the second low shear strength material that undergoes a polymorphic phase change to a more dense phase is between ten percent and inety percent of the total volume of the first and second low shear strength materials forming the intermediate and end portions.

4. The improvement of claim 1 wherein;
a pressure transmitting media and an electrical resistance heater tube are concentrically arranged within the inner bushing to provide indirect heating to the reaction charge;

the pressure transmitting media including a cylindrical sleeve concentrically disposed between the electrical resistance heater and the reaction charge and a pair of end members disposed within the sleeve and contacting opposite ends, respectively, of the reaction charge;

the pressure transmitting media being formed of a low shear strength material that undergoes a polymorphic phase change to a more dense phase within the operating pressure range.

5. The improvement of claim 4 wherein the pressure transmitting media material is potassium bromide.

* * * * *